(12) United States Patent
Kearney

(10) Patent No.: US 7,511,218 B2
(45) Date of Patent: Mar. 31, 2009

(54) ELECTRICAL BOX GUARD

(76) Inventor: Mark Kearney, 12740 Mumford Rd., Garrettsville, OH (US) 44231

( * ) Notice: Subject to any disclaimer, the term of this patent is extended or adjusted under 35 U.S.C. 154(b) by 6 days.

(21) Appl. No.: 11/622,480

(22) Filed: Jan. 12, 2007

(65) Prior Publication Data

US 2008/0169115 A1    Jul. 17, 2008

(51) Int. Cl.
*H05K 5/03* (2006.01)
*H02G 3/14* (2006.01)

(52) U.S. Cl. .............. 174/66; 174/67; 174/53; 220/241; 220/242; 33/DIG. 10

(58) Field of Classification Search .......... 174/66, 174/67, 50, 480, 481, 53, 57, 58; 220/3.2, 220/3.3, 3.8, 3.9, 4.02, 241, 242; 33/DIG. 10, 33/528; D13/177, 156; D8/353; 439/535, 439/536
See application file for complete search history.

(56) References Cited

U.S. PATENT DOCUMENTS

| | | | | |
|---|---|---|---|---|
| 2,492,115 | A * | 12/1949 | Crwother | 174/66 |
| 3,015,408 | A | 1/1962 | Campbell et al. | |
| 3,619,477 | A | 11/1971 | Rasmussen | |
| 3,950,857 | A * | 4/1976 | Zanavich | 33/528 |
| 4,979,633 | A | 12/1990 | Lakey | |
| 5,301,437 | A * | 4/1994 | Burke | 33/528 |
| 5,526,952 | A | 6/1996 | Green | |
| 5,562,222 | A | 10/1996 | Jordan et al. | |
| 5,639,991 | A | 6/1997 | Schuette | |
| 6,005,190 | A * | 12/1999 | Stark et al. | 174/66 |
| 6,538,202 | B1 | 3/2003 | Shaffer et al. | |
| 6,653,566 | B2 | 11/2003 | Petak et al. | |
| 6,686,540 | B2 | 2/2004 | Compagnone et al. | |
| 6,740,813 | B1 * | 5/2004 | Gretz | 174/66 |
| 6,906,260 | B2 * | 6/2005 | Grendahl | 174/66 |
| 2003/0213801 | A1 | 11/2003 | Bradley et al. | |

OTHER PUBLICATIONS

WireGuard Ad, NecDigest, Oct. 2006, p. 42.

* cited by examiner

*Primary Examiner*—Angel R Estrada
(74) *Attorney, Agent, or Firm*—Tarolli, Sundheim, Covell & Tummino LLP

(57) ABSTRACT

A flexible insert or guard has an elongated plastic body having a length to cover an opening of an electrical box and having two prongs or posts extending outwardly from the body for insertion into spaced apart mounting holes of the electrical box. The elongated plastic body flares outwardly at its ends in a region of the prongs and narrows along a center section to provide a gap between the insert and side walls of said electrical box wide enough to allow the insert to be removed after drywall is installed.

8 Claims, 4 Drawing Sheets

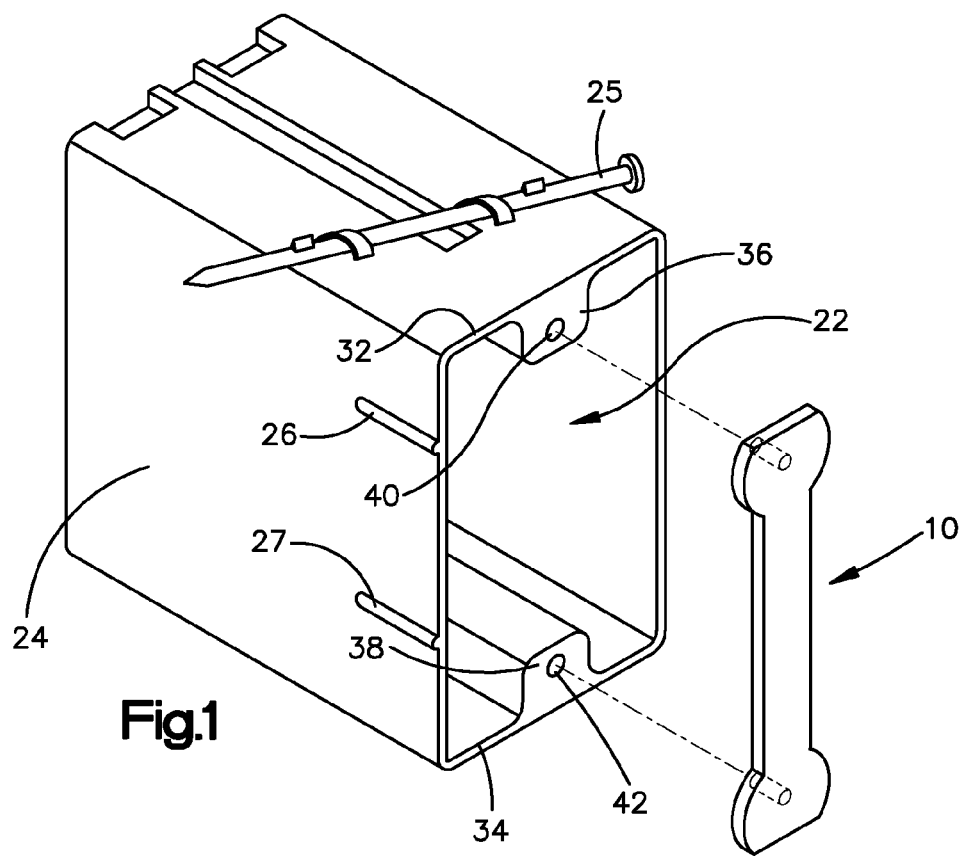
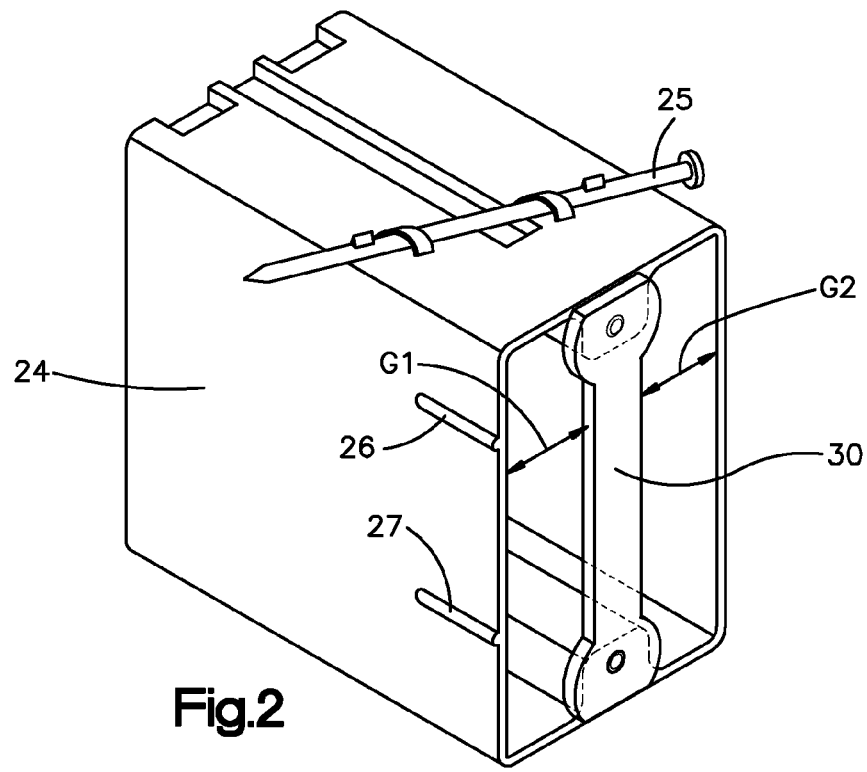

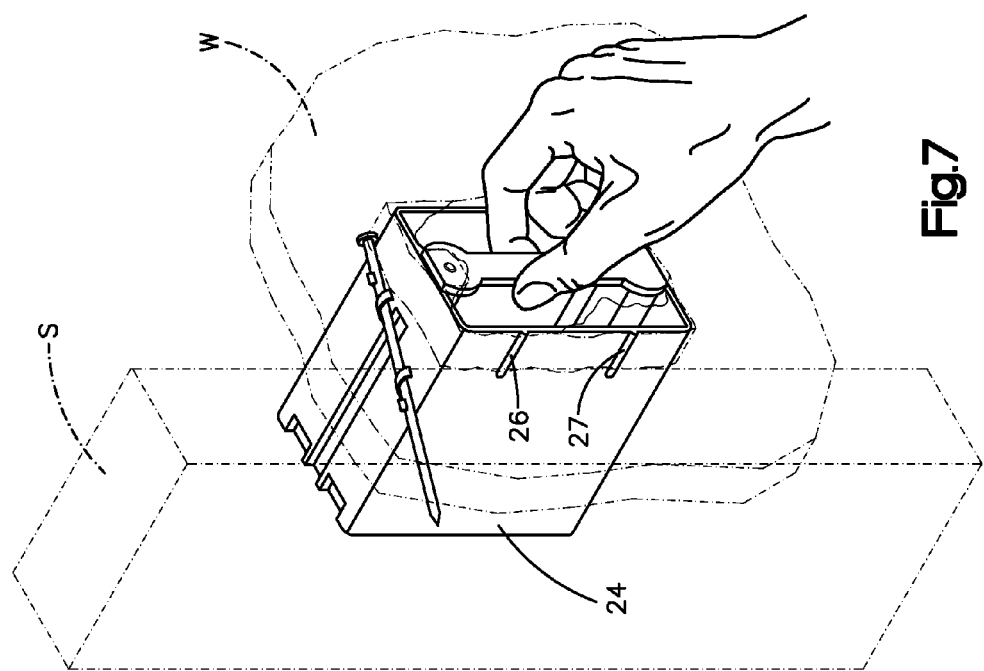
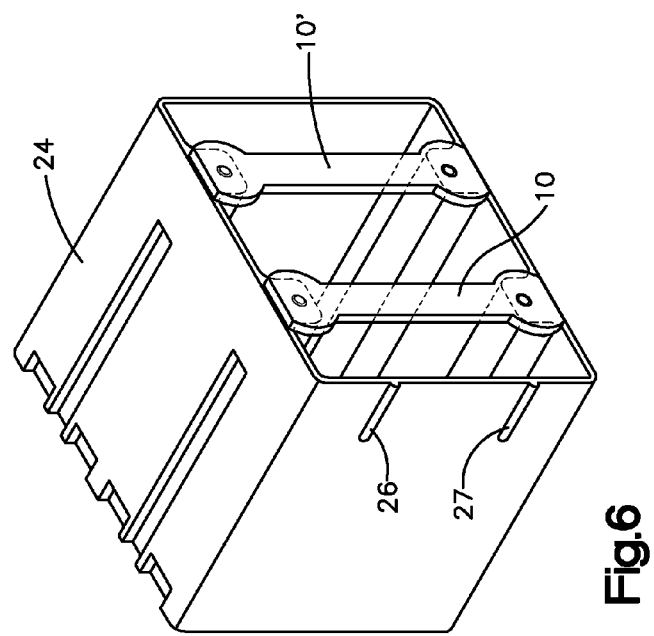

ELECTRICAL BOX GUARD

FIELD OF THE INVENTION

The present invention concerns a device for use while installing electrical boxes to safeguard the electrical box and wiring inside the box from damage.

BACKGROUND ART

During the construction of residential and commercial buildings, wiring is installed prior to the installation and plastering of drywall. In particular, electrical boxes are attached to the building infrastructure such as wood or metal studs. These electrical boxes are junctions for switches, electrical outlets etc. Once the electrical boxes are mounted and the wiring has been routed from a main junction box to the individual boxes spaced throughout the building, the drywall installers install and finish the walls. Then the electrician returns to finalize installation and wiring connection of the switches, outlets and cover plates.

One process that is commonly used by the wall board installers is to lean the wall board up against the electrical box so that the electrical box makes an impression on the inside (non-exposed) side of the wall board. This impression marks the area the installer must cut away from the wall board to accommodate the electrical box. This step can damage the wiring exposed within the box. Another problem for the electrician occurs the wall board installer tape and mud the wall board joints. A switch box housing can often be placed at the level of a seam between adjacent horizontally extending wall boards (48" from the floor) The wall board installer may pass his or her trowel over the exposed outlet box (after cutting an opening in the wall board) and may cover or partially fill the box with joint compound. This makes the electrician's job of connecting the wires to the switch or outlet more difficult and in some instances may require rewiring the electrical box.

U.S. Pat. No. 5,639,991 to Schuette, U.S. Pat. No. 7,075,008 to Smith, U.S. Pat. No. 3,015,408 to Campbell et al, and U.S. Pat. No. 6,538,202 to Shafer et al are prior art patents relating to electrical box covers.

SUMMARY

The invention concerns a guard or insert having posts or studs that extend from an insert body to attach the insert to an electrical outlet box or switch box. The installer puts this device in place after the box has been mounted to a stud but before the wall boards are installed to protect the electrical box and its contents from damage.

In one exemplary embodiment, the device has an elongated plastic body having a length to cover an opening of said electrical box and having two prongs extending outwardly from the body for insertion into spaced apart mounting holes of the electrical box. The elongated plastic body has a center section dimensioned to provide a gap between the flexible insert and side walls of said electrical box. This allows the device to be removed subsequent to mounting of drywall sheets around the electrical box so the wiring of the electrical box can be completed.

These and other features of the invention are further described in conjunction with the accompanying drawings.

BRIEF DESCRIPTION OF THE DRAWINGS

FIG. 1 is a perspective view of an electrical box and an insert for such a box;

FIG. 2 is a perspective view of the electrical box of FIG. 1 with the insert installed in engagement with the box;

FIG. 6 is a perspective view of two inserts connected to a two gang electrical box; and FIG. 7 is a perspective view showing the insert being removed after installation of wall board to studs which support the electrical box depicted therein.

EXEMPLARY MODE FOR PRACTICING THE INVENTION

The drawings depict a molded plastic guard or insert 10 for covering exposed wires in an already installed electrical box 24 to prevent the wires from becoming encrusted with joint compound. A thin (in plan) elongated body of the insert allows an electrician to reach with his or her thumb and forefinger into an opening 22 in the electrical box 24 after the wallboard has been installed to remove the insert. The electrician can then complete installation of the switches, outlets etc by connecting them to wiring at the box protected from damage by the guard or insert.

Two such inserts 10, 10' are shown in FIG. 6 installed side by side parallel fashion in an electrical box 24 having room for multiple switches or controls due to the enlarged width of the box. The spacing between the two inserts 10, 10' leaves room for inserting the electrician's thumb and forefinger between the adjacent inserts 10, 10' to remove both inserts after installation of the wall board in the region of the box 24.

Figure 2A:
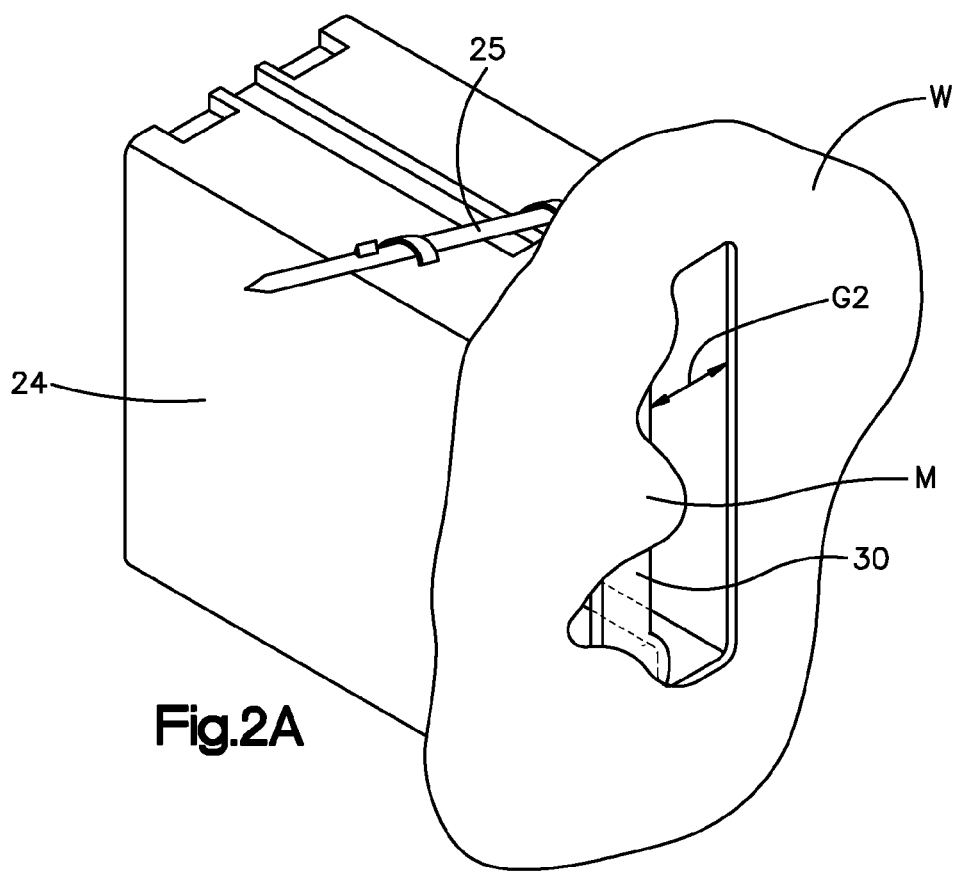
FIG. 2A is a perspective view of an electrical box installed with wallboard and wallboard sealant or mud overlapping the opening of the electrical box.
Figure 3:
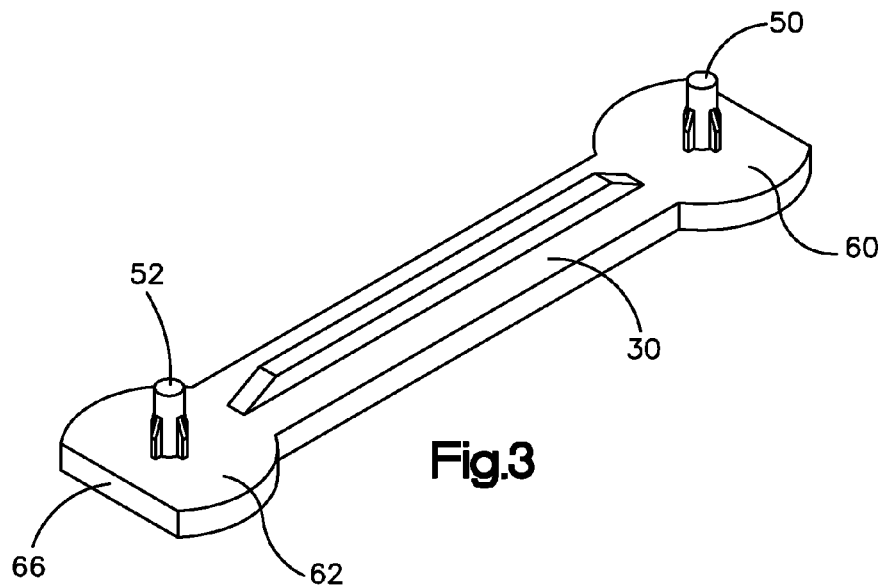
FIG. 3 is perspective view of the insert showing a side of the insert which faces an interior of the box in use.
Figure 4:
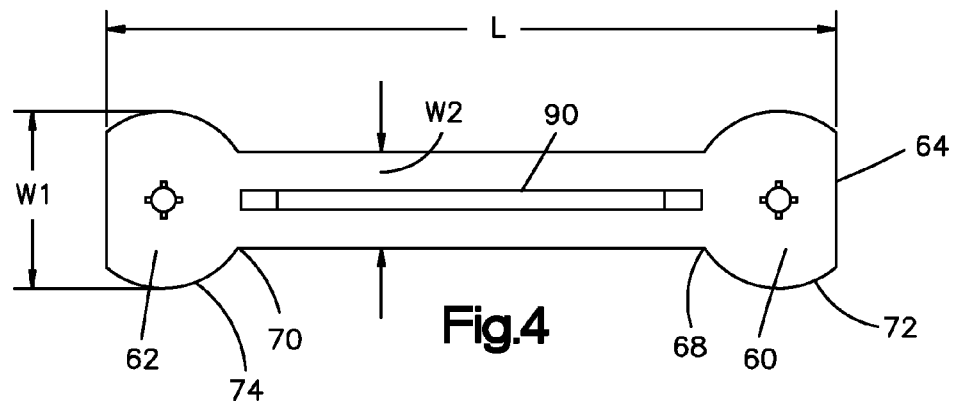
FIG. 4 is a plan view of the insert of FIG. 3.

Most typically the box 24 is used in residential construction and is constructed of plastic (nothing however would preclude use of the invention with a metal box). The box 24 is installed, typically by attaching the box to an upright stud S prior to placement of wallboard W over the stud. The box 24 is attached by pounding a nail 25 through loops in a top of the box into the stud. Two elongated ribs 26, 27 allow the installer to position the box properly with respect to the stud so that a from one half inch portion of the box extends in front of a front surface of the stud. This assures that when the wallboard W is installed, the front of the box is roughly co planar with the front surface of the wallboard. FIG. 2A is a schematic depiction of an electrical box 24 that is installed and wallboard installed leaving a region of wallboard compound or mud M that overlaps a front of the electrical box.

An exemplary insert 10 is flexible and is preferably made by injection molding plastic (most preferably polypropelene black plastic). The insert has an elongated plastic body 30 having a length L to extend between edges 32, 34 of the electrical box 20. As depicted in FIG. 1 and as well know in the prior art, the electrical box 20 has two inwardly extending tabs or tangs 36, 38 each of which define a respective threaded opening 40, 42. These threaded openings 40, 42 are used to mount switches, outlets or the like to the electrical box by means of appropriate threaded connectors (not shown).

The exemplary insert 10 has two generally cylindrical outwardly extending prongs or posts 50, 52 that extend from the body 30 of the insert. The prongs are spaced for insertion into the spaced apart mounting holes or openings 38, 40 of the electrical box. Thus, the spacing between the prongs or posts 50, 52 is not arbitrary but is instead based on the industry standard spacing between electrical box openings.

As seen in the drawings, the elongated plastic body 30 flares outwardly at its enlarged ends 60, 62 in a region of the prongs 50, 52 and narrows along a center section to provide a gap between the insert body and side walls of said electrical box 20. The enlarged ends 60, 62 are generally symmetric about a center line of the insert and each has a truncated planar end 64, 66 approximately co-extensive with the outer sides of the top and bottom of the electrical box. At a region or juncture 68, 70 where the enlarged ends meet the center narrow portion of the body the ends widen outwardly along generally circular, curved surfaces 72, 74 until they reach the truncated ends. In the illustrated embodiment these curved surfaces subtend an angle of slightly less than 90 degrees on the two sides of the insert.

Figure 5:
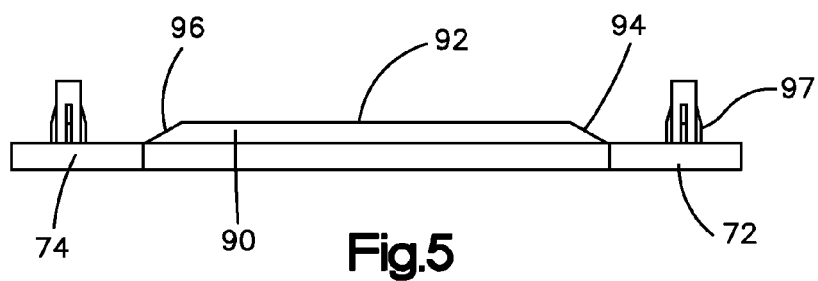
FIG. 5 is an elevation view of the insert of FIG. 3.

One side of the body (facing outward when installed) defines a generally planar surface as seen in the elevation view of FIG. 5. On an opposite side of the body, the prongs or posts 50, 52 extend away from the body a sufficient distance to mate with and enter the holes 40, 42 of the electrical box to secure the insert to the box. Also on this opposite side of the body, the insert includes an elongated spine 90 that extend from the center section of the insert body beginning at the region where the enlarged ends begin. The spine has a center section 92 and two tapered or beveled sections 94, 96. The purpose of the spine is to stiffen the body and avoid undue flexing as the insert is being inserted, retracted or as the insert is acting as a guard to avoid damage.

In the exemplary embodiment of the invention, the width W2 of the center section of the insert body is approximately ½ inches but widths ranging between ⅜ inch to 1 and ½ inches have been found to be suitable with widths from one half to one inch preferable. The narrowing of the insert facilitates insertion of ones fingers into a the gaps G1, G2 on either side of the center section when removing the insert. A standard size electrical box such as the box shown in FIG. 1 is constructed from plastic and is 3¾ inches long by 2¼ to 2½ inches wide. The length L of the exemplary insert matches the length of the box, but this is not critical to operation of the insert. The important dimension is the spacing between the prongs to match the industry standard spacing between the threaded openings 40, 42 of the box. Generally widths of the gaps G2, G2 on either side of the insert in the range of from ½ to 1 inch would satisfy the requirement for removal. Gaps of ⅜ to ½ inch might be suitable for some applications. In the exemplary embodiment, the gaps G1, G2 are about the same width with the insert installed. Stated another way, the insert is generally symmetric about a center line of the body 30. As the wallboard installer muds the wallboard which has been screwed to the stud S the trowel sweeps over the interface between the stud and the box 24 and partially covers the insert 10. In the depiction of FIG. 2A the trowel was swept from left to right and has essentially filled the gap G1 with compound material or mud M. The electrician, however, can reach into the box (breaking through the mud M if necessary to the gap G1) grasp the insert and remove it without difficulty.

For multiple gang boxes such as shown in FIG. 6, the spacing between adjacent pairs (top and bottom) holes of the industry standard boxes is about 1 and 13/16 inches. For one half inch wide inserts, this means a spacing between adjacent vertically oriented edges that bridge or span front and back surfaces of the insert of 1 and 5/16 inches. As the width of the inserts is increased, the gap will narrow and for an insert of one and one half inches the gap will narrow down to slightly more than one quarter inch.

A representative thickness of the insert is 0.15 inches and the thickness of the rib plus the main body of the insert is 0.337 inches. The stiffening rib has a total length including the tapered ends of 2⅜ inches. The exemplary prongs or posts are generally circular in plan and have a diameter of 0.118 inches. They preferably extend a distance of approximately ¼ inch above the surface of the insert and have four circumferencially spaced stiffening ribs or flanges 97 which taper along their length. The ribs 97 have radially outer surfaces that contact the threaded interior of the box's openings to frictionally engage this interior and keep the guard in place. The ribs strengthen the post and reduce the tendency of the post to break with use.

The exemplary embodiment of the invention has been described with a degree of particularity. It is the intent, however, that the invention include all modifications and alterations from the disclosed design falling within the spirit or scope of the appended claims.

The invention claimed is:

1. A one piece injection molded plastic insert for engagement with an electrical box comprising an elongated body having a length to cover an opening of said electrical box and having two posts extending outwardly from the body for insertion into spaced apart mounting holes of said electrical box wherein the elongated body has two relatively wide flared out end regions that surround the posts and a narrower center section that has a uniform width of between one half inch and one inch and extends more than half the length of the plastic insert between the flared out end regions to leave a gap between the center section of the elongated body and side walls of said electrical box.

2. The plastic insert of claim 1 wherein the elongated body has a strengthening spine that extends along a portion of the elongated body.

3. The plastic insert of claim 2 wherein the elongated body defines a generally planar surface on one side and wherein the posts and strengthening spine extend out from the body along an opposite surface of the body from said generally planar surface.

4. The plastic insert of claim 1 wherein a length of the posts ranges from ⅛ inch to ⅜ inches in length.

5. The plastic insert of claim 1 wherein the posts are generally cylindrical and include spaced apart flanges extending along a portion of a posts near the elongated body having outer surfaces that engage inner walls of threaded openings of an electrical box.

6. A one piece injection molded plastic insert for engagement with an electrical box comprising an elongated body having a length to cover an opening of said electrical box and having two posts extending outwardly from the elongated body for insertion into spaced apart mounting holes of said electrical box wherein the elongated body has two relatively wide flared out end regions that surround the posts and a narrower center section that has a uniform width that extends between the flared out end regions dimensioned to leave a gap between the center section of the elongated body and side walls of said electrical box.

7. The plastic insert of claim 6 wherein a width of the center section along at least a portion of the elongated body is in a range of from ⅜ inch to 1 and ½ inches.

8. The plastic insert of claim 6 wherein the center section has a uniform width that extends over more than half of the length of the insert in a region between end walls of the electrical box and wherein the uniform width is between about one half inch and one inch.

* * * * *